US012664977B2

(12) United States Patent
Yang et al.

(10) Patent No.: US 12,664,977 B2
(45) Date of Patent: Jun. 23, 2026

(54) FLY PARAMETER COMPRESSION AND DECOMPRESSION TO FACILITATE FORWARD AND/OR BACK PROPAGATION AT CLIENTS DURING FEDERATED LEARNING

(71) Applicant: GOOGLE LLC, Mountain View, CA (US)

(72) Inventors: Tien-Ju Yang, Mountain View, CA (US); Yonghui Xiao, Sunnyvale, CA (US); Giovanni Motta, San Jose, CA (US); Françoise Beaufays, Mountain View, CA (US); Rajiv Mathews, Sunnyvale, CA (US); Mingqing Chen, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 145 days.

(21) Appl. No.: 18/652,587

(22) Filed: May 1, 2024

(65) Prior Publication Data

US 2024/0371362 A1 Nov. 7, 2024

Related U.S. Application Data

(60) Provisional application No. 63/463,984, filed on May 4, 2023.

(51) Int. Cl.
$G10L\ 15/06$ (2013.01)
(52) U.S. Cl.
CPC .................................. $G10L\ 15/063$ (2013.01)
(58) Field of Classification Search
CPC ........ G10L 15/063; G10L 15/30; G10L 15/16
See application file for complete search history.

(56) References Cited

U.S. PATENT DOCUMENTS

2016/0063393 A1* 3/2016 Ramage .............. H04L 67/1396
706/12
2021/0133929 A1* 5/2021 Ackerson .............. G06T 3/4092
(Continued)

FOREIGN PATENT DOCUMENTS

WO WO-2022019885 A1 * 1/2022 ............. G06N 3/045

OTHER PUBLICATIONS

Kairouz, P. et al., "Advances and Open Problems in Federated Learning;" Cornell University, arXiv.org, arXiv:1912.04977v1; 105 pages; dated 2019.

(Continued)

*Primary Examiner* — Michael Colucci
(74) *Attorney, Agent, or Firm* — Gray Ice Higdon

(57) ABSTRACT

Implementations are directed to efficient federated learning of machine learning (ML) model(s) through on-the-fly decompression and compression of model parameters, of the ML model(s), when facilitating forward propagation and/or back propagation at client device(s). For example, implementations can transmit, from a remote system to a client device, a compressed on-device ML model that includes some compressed parameters. Further, the client device can, in performing forward propagation and/or back propagation using the on-device ML model, decompress those compressed parameters on-the-fly as the parameters are needed for the propagation. The propagation will utilize the decompressed parameters that were decompressed on the fly. Further, after the decompressed parameters are utilized, they can be deallocated from memory (while their compressed counterparts optionally remain in memory) to enable allocation of memory for further decompressed parameters that will be needed next and/or needed for other ongoing process(es).

20 Claims, 4 Drawing Sheets

(56) References Cited

U.S. PATENT DOCUMENTS

| | | | | |
|---|---|---|---|---|
| 2022/0068268 | A1* | 3/2022 | Kracun | G10L 15/197 |
| 2022/0398500 | A1* | 12/2022 | Singhal | G06N 20/20 |
| 2023/0074979 | A1* | 3/2023 | Brehmer | G06N 3/08 |
| 2023/0232278 | A1* | 7/2023 | Oh | H04W 74/0833 |
| | | | | 370/329 |
| 2023/0368077 | A1* | 11/2023 | Yao | G06N 20/00 |
| 2024/0022927 | A1* | 1/2024 | Tong | H04W 4/40 |
| 2024/0174254 | A1* | 5/2024 | Chen | G06F 18/214 |
| 2024/0281564 | A1* | 8/2024 | Kairouz | H03M 7/3002 |
| 2024/0303504 | A1* | 9/2024 | Xu | G06N 3/084 |
| 2024/0397468 | A1* | 11/2024 | Barbu | G06N 3/045 |

OTHER PUBLICATIONS

Panayotov, V. et al., "Librispeech: An ASR Corpus Based on Public Domain Audio Books," in Acoustics, Speech and Signal Processing (ICASSP); IEEE International Conference; pp. 5206-5210; dated 2015.

Narayanan, A. et al., "Recognizing Long-Form Speech Using Streaming End-To-End Models," in IEEE Automatic Speech Recognition and Understanding Workshop (ASRU); pp. 920-927; dated 2019.

Shen, J. et al., "Lingvo: A Modular and Scalable Framework for Sequence-to-Sequence Modeling"; CoRR, arXiv:1902.08295; 2019; 17 pages; dated 2019.

Sandler et al., "MobileNetV2: Inverted Residuals and Linear Bottlenecks", Proceedings of the IEEE Conference on Computer Vision and Pattern Recognition, pp. 4510-4520, dated 2018.

Caldas, S. et al., "Expanding the Reach of Federated Learning by Reducing Client Resource Requirements"; arXiv.org; Cornell University; arXiv:1812.07210v1; 12 pages; dated Dec. 18, 2018.

Abdolrashidi, A. et al., "Pareto-Optimal Quantized ResNet Is Mostly 4-bit"; arXiv.org, Cornell University; arXiv.2105.03536v1; 9 pages; dated May 7, 2021.

Chen, T. et al., "Training Deep Nets with Sublinear Memory Cost"; arXiv.org; Cornell University; arXiv.1604.06174v2; 12 pages; dated Apr. 22, 2016.

Chraibi, S. et al., "Distributed Fixed Point Methods with Compressed Iterates"; arXiv.org; Cornell University; arXiv.1912.09925v1; 15 pages; dated Dec. 20, 2019.

Gulati, A. et al., "Conformer: Convolution-augmented Transformer for Speech Recognition"; in Conference of the International Speech Communication Association (INTER-SPEECH); 5 pages; dated Oct. 2022.

Guliani, D. et al., "Enabling On-Device Training of Speech Recognition Models with Federated Dropout," in IEEE International Conference on Acoustics, Speech and Signal Processing (ICASSP); 5 pages; dated 2022.

Han, S. et al., "Deep Compression: Compressing Deep Neural Networks with Pruning, Trained Quantization and Huffman Coding"; in International Conference on Learning Representations (ICLR); arXiv:1510.00149v5; 14 pages; dated 2016.

He, C. et al., "Group Knowledge Transfer: Federated Learning of Large CNNs at the Edge"; in Advances in Neural Information Processing Systems (NeurIPS); 13 pages; dated 2020.

Howard, A.G. et al., "MobileNets: Efficient Convolutional Neural Networks for Mobile Vision Applications"; arXiv.org; Cornell University; arXiv.1704.04861v1; 9 pages; dated Apr. 17, 2017.

Hsieh, K. et al., "The Non-IID Data Quagmire of Decentralized Machine Learning"; arXiv.org; Cornell University; arXiv.1910.00189v1; 18 pages; dated Oct. 1, 2019.

Huang, J. et al., "An In-Depth Study of LTE: Effect of Network Protocol and Application Behavior on Performance"; in Proceedings of the ACM SIGCOMM Conference; 12 pages; dated 2013.

Konecny, J. et al., "Federated Learning: Strategies for Improving Communication Efficiency," in Advances in Neural Information Processing Systems (NeurIPS) Workshop on Private Multi-Party Machine Learning; 5 pages; dated 2016.

Li, B. et al., "A Better and Faster End-to-End Model for Streaming ASR," in IEEE International Conference on Acoustics, Speech and Signal Processing (ICASSP); arXiv:2011.10798v2; 5 pages; dated 2021.

Misra, A. et al., "A Comparison of Supervised and Unsupervised Pre-Training of End-to-End Models"; in Conference of the International Speech Communication Association (INTERSPEECH); 5 pages; dated 2021.

Rastegari, M et al., "XNOR-Net: ImageNet Classification Using Binary Convolutional Neural Networks," in European Conference on Computer Vision (ECCV); 18 pages; dated 2016.

Wang, J. et al., "A Field Guide to Federated Optimization"; arXiv.org, Cornell University; arXiv.2107.06917v1; 88 pages; dated Jul. 14, 2021.

Yang, T-J. et al., "NetAdaptV2: Efficient Neural Architecture Search with Fast Super-Network Training and Architecture Optimization"; in Conference on Computer Vision and Pattern Recognition (CVPR); 10 pages; dated 2021.

Yang, T-J. et al., "Designing Energy-Efficient Convolutional Neural Networks using Energy-Aware Pruning"; in IEEE Conference on Computer Vision and Pattern Recognition (CVPR); 9 pages; dated 2017.

Yang, T-Y. et al., "Partial Variable Training for Efficient On-Device Federated Learning"; in IEEE International Conference on Acoustics, Speech and Signal Processing (ICASSP); 5 pages; dated 2022.

Zoph, B. et al., "Neural Architecture Search with Reinforcement Learning," in International Conference on Learning Representations (ICLR); 16 pages; dated 2017.

* cited by examiner

100

BACK PROPAGATION
108

DECOMPRESSED
LAYER PARAMETERS
104

COMPRESSED
PARAMETER DATA
102

LAYER-N PROCESSING
110

UPDATED DECOMPRESSED
PARAMETERS
106

FORWARD PROPAGATION
112

DECOMPRESSED
LAYER PARAMETERS
114

200

COMPRESSED
PARAMETERS
202

TRANSFORMED
PARAMETERS
206

DECOMPRESSED
PARAMETERS
204

LAYER-VARIABLE
DATA
208

FLY PARAMETER COMPRESSION AND DECOMPRESSION TO FACILITATE FORWARD AND/OR BACK PROPAGATION AT CLIENTS DURING FEDERATED LEARNING

BACKGROUND

Federated learning of machine learning (ML) model(s) is a technique for training ML model(s) in which an on-device ML model is stored locally on a client device of a user, and a global ML model, that is a remote-based counterpart of the on-device ML model, is stored remotely at a remote system (e.g., a remote server or a cluster of remote servers). The client device, using the on-device ML model, can process user input detected at the client device to generate predicted output, and can generate a gradient based on the predicted output in a supervised or unsupervised manner.

In some implementations, the client device can transmit the gradient to the remote system. The remote system can utilize the received gradient, and, additional gradients generated in a similar manner at the client device or additional client devices, to update weights and/or other parameters of the global ML model, to generate an updated global ML model.

In some additional or alternative implementations, the client device can locally train on-device ML model based on the gradient and additional gradients generated in a similar manner at the client device. The client device can transmit the locally trained on-device ML model (e.g., at least updated weights and/or parameters thereof) to the remote system. The remote system can aggregate the locally trained on-device ML model, with other locally trained on-device ML models and/or the global ML model, to generate an updated global ML model. The remote system can transmit an updated global ML model, and/or updated weights and/or parameters of the global ML model, to the client device. The client device can then replace the on-device ML model with the updated global ML model, or replace any parameters of the on-device ML model with the updated parameters of the updated global ML model, thereby updating the on-device ML model.

However, federated learning of ML model(s) can cause computational resources to be unnecessarily consumed at the client device and/or the client device may not have sufficient resources to store and train full-sized ML model(s) locally at the client device. For example, assume an on-device automatic speech recognition (ASR) model is utilized to generate a transcription that is predicted to correspond to a spoken utterance captured in a stream of audio data via microphone(s) of the client device. In this example, the predicted output can correspond to the transcription, or a portion thereof, and the gradient can be generated based on the transcription. In generating the gradient, on-device memory would be consumed by storing activations at each layer of the on-device ASR model, and on-device computational resources would be consumed by: computing an attributable loss for each portion of the on-device ASR model, and causing the loss to be backpropagated appropriately across each portion of the on-device ASR model. As a result, consumption of on-device memory and other computational resources (e.g., network bandwidth, processing bandwidth, etc.) would be inefficiently consumed across the numerous client devices being employed for facilitating the federated learning process.

SUMMARY

Implementations disclosed herein are directed to efficient federated learning of machine learning (ML) model(s)

through on-the-fly decompression and compression of model parameters, of the ML model(s), when facilitating forward propagation and/or back propagation at client device(s). For example, implementations can transmit, from a remote system to a client device, a compressed on-device ML model that includes some compressed parameters. For example, a majority of the ML model parameters can be compressed, 90% or more of the ML model parameters can be compressed, and/or all of the ML model parameters can be compressed.

Further, the client device can, in performing forward propagation and/or back propagation using the on-device ML model, decompress those compressed parameters on-the-fly as the parameters are needed for the propagation. The propagation will utilize the decompressed parameters that were decompressed on the fly. Further, after the decompressed parameters are utilized, they can be deallocated from memory (while their compressed counterparts optionally remain in memory) to enable allocation of memory for further decompressed parameters that will be needed next and/or for other ongoing process(es). Yet further, in the case of back propagation, any decompressed parameters updated by the backpropagation can be compressed and stored (e.g., in memory and then in non-memory storage) in the compressed format prior to being deallocated from memory. A compressed updated parameter can replace a compressed pre-updated parameter in memory and/or in non-memory storage, and the compressed updated parameter utilized in a next forward propagation in lieu of the compressed pre-updated parameter.

In these and other manners, forward and/or back propagation using the on-device ML model is enabled, while mitigating the extent of memory utilization at the client device. This enables a client device to perform forward and/or back propagation without overly constraining memory resources of the client device. Further, and as referenced above, the compressed on-device ML model can be transmitted from the remote system to the client device. Yet further, an updated compressed on-device ML model can be transmitted from the client device to the remote system. Transmitting the compressed on-device ML model, in lieu of an uncompressed counterpart, can preserve limited network resources. Such preservation of limited network resources is especially impactful in many federated learning scenarios where hundreds or thousands of client devices can be involved.

In some implementations, processor(s) of a given client device can receive client input data and process the client input data using a given on-device ML model to generate predicted output. The processing of the client input data via forward propagation can involve decompressing, by a client device, client model data (e.g., parameter(s)) for at least a portion of a given layer, of the on-device ML model, that is currently being used in processing, while other client model data remains compressed but, optionally, allocated to memory (e.g., RAM or other memory) in the compressed state. When forward propagation using the decompressed client model data for the given layer is completed, the client device memory can be deallocated for the decompressed model data, and then reallocated for additional decompressed model data. For example, it can be reallocated for to be decompressed model data for a next portion of the given layer to be used in processing, or for a next layer to be used in processing. When forward propagation is completed, and a predicted output for the on-device ML model has been generated, a loss can be generated for updating model parameters during back propagation. For example, the loss can be generated in a supervised manner based on comparing the predicted output to ground truth output. For instance, the ground truth output can be generated based on implicit or explicit user feedback provided in response to rendering the predicted output to the user.

As a particular example, for a given layer of a given on-device ML model that is currently being used in back propagation, a subset of compressed client model data for the given layer can be decompressed and the decompressed client model data allocated to memory for use in back propagation for that given layer. When back propagation for that given layer is completed, the decompressed client model data for the given layer can be deallocated from memory, and the memory reallocated for a different decompressed subset of model data (e.g., a decompressed subset of parameters for a next layer for processing). After back propagation is completed for the on-device ML model and for the loss, an update can be provided, by the client device, to the remote system in a compressed format. For example, the update can be a compressed version of the client device trained on-device ML model (e.g., at least updated weights and/or parameters thereof). In these and other manners, a global ML model of the remote system to be updated based on the compressed update from the client device, and other compressed updates from any other client devices participating in the federated learning process. These compressed updates and/or other compressed model data from the client devices can be decompressed by the server remote system, and the decompressed data can then be utilized to update the global ML model. A subsequent update for all on-device ML models can then be generated and compressed at the remote system, and provided to each participating client device, thereby allowing each on-device ML model to be updated accordingly.

In some implementations, a portion of the client ML model data can be provided in a non-compressed state in which decompression is not necessary when utilizing that portion of the client ML model data for forward propagation and/or back propagation. For example, in some implementations, some model parameters characterized by the client ML model data can be transmitted to the client device in a non-compressed state and can remain in the non-compressed state during forward propagation and/or back propagation. For instance, model parameters for certain layers and/or certain type(s) of model parameters can be non-compressed. As a particular instance, model parameters for scaling factors and/or biases in normalization layers can be non-compressed. As a particular example, assume audio data capturing a spoken utterance of a human user of "Hey Assistant, turn on the kitchen lights" is generated via microphone(s) of a given client device of the human user. In this example, the audio data capturing the spoken utterance can correspond to the client input data. Further, the audio data can be processed using an on-device automatic speech recognition (ASR) model stored in on-device memory of the given client device to generate ASR data, such as one or more speech hypotheses that are predicted to correspond to the spoken utterance captured in the audio data. When generating the ASR data from the audio data using the client ML model (e.g., the ASR model), forward propagation can be performed using an on-device ML model previously received from a remote system. For some layers of the client ML model, parameters that were not previously compressed by the remote system and/or the client device can be utilized to facilitate forward propagation. Alternatively, or additionally, for other layers of the client ML model, a subset of the client ML model data can be decompressed to access other parameters for facilitating the forward propagation.

Continuing the above example, a gradient can be generated for any loss resulting from differences between an output predicted using the on-device ML model and ground truth data, and the gradient can be utilized to determine updated parameters. For example, a predicted output of "Hey Assistant, turn on the basement lights" can result in a loss relative to ground truth data that indicates the spoken utterance embodied the command, "Hey Assistant, turn on the kitchen lights." Back propagation can be facilitated by determining the loss, in furtherance of generating updated parameters that can be provided to the remote system. For example, updating parameters for some initial layers during back propagation can be performed without decompressing any subset of data (e.g., a bias parameter matrix) of the client ML model data. Alternatively, updating those parameters for those initial layers during back propagation can necessitate decompressing certain subsets of data (e.g., a compressed weight parameter matrix) of the client ML model data. When parameters for a given layer have been updated, those parameters can be compressed or, optionally, remain non-compressed before being communicated to the remote system. In these and other manners, parameters that are more sensitive can be non-compressed or otherwise not be subject to any compression or decompression process. Otherwise, other parameters that are less sensitive can be compressed in furtherance of preserving memory and other resources during federated learning.

The above description is provided as an overview of some implementations of the present disclosure. Further description of those implementations, and other implementations, are described in more detail below.

Other implementations can include a non-transitory computer readable storage medium storing instructions executable by one or more processors (e.g., central processing unit(s) (CPU(s)), graphics processing unit(s) (GPU(s)), digital signal processors (DSP(s)), and/or tensor processing unit(s) (TPU(s)) to perform a method such as one or more of the methods described above and/or elsewhere herein. Yet other implementations can include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figures 1, 2:
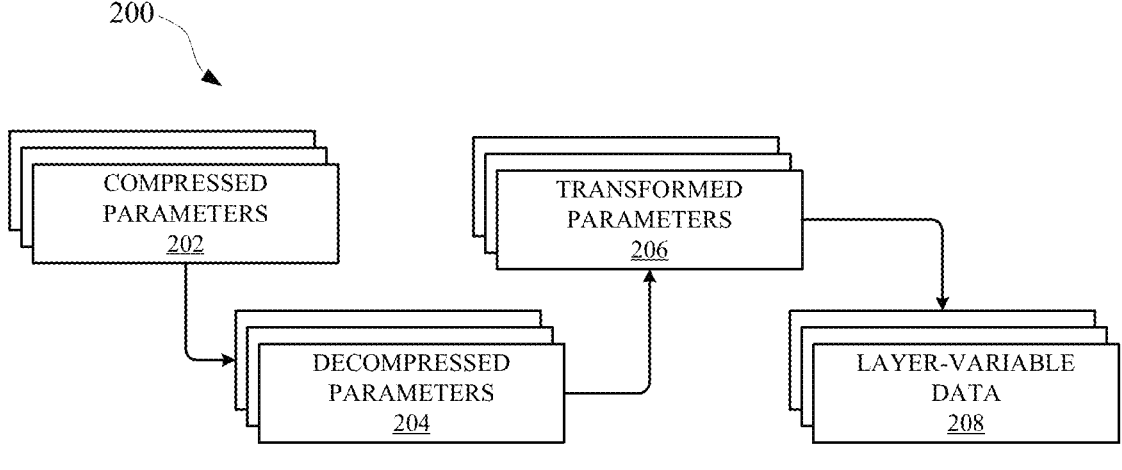
FIG. 1 illustrates a view of a system for performing Online Model Compression (OMC) for Federated Learning processes.
FIG. 2 illustrates a view of a process for transforming compressed parameters to transformed layer parameters.

Federated learning (FL) allows for training neural network models directly on edge devices (referred to as client devices) instead of transferring their data back to a server for centralized training, thereby allowing FL to preserve user privacy. FL is composed of multiple federated rounds. In a standard federated round, a server model is first transported to clients; then, the clients train the model (e.g., their client ML model) on their local data. The trained models are finally transported back to the server and aggregated to improve the server model (e.g., a global ML model). This process is repeated until the server model converges.

FL involves on-device training and model transportation between servers and clients, which lead to two main challenges. The first challenge is that edge devices usually have limited memory available for training. Given the fact that recent Automatic Speech Recognition (ASR) models can typically contain hundreds of millions of parameters or more, keeping these parameters in full precision in memory can exceed the available memory. Although there may be significant effort in the field on reducing memory usage of parameters during inference, such as quantization-aware training, it is usually at the cost of higher memory usage during training. The second challenge is the high communication cost. Communication can be much slower than computation, and transporting models in full precision also burdens the communication network.

In some implementations, Online Model Compression (OMC) addresses these challenges of on-device FL. Different from regular full-precision FL, where each client keeps, updates, and transports full-precision parameters, OMC keeps and transports at least some of the parameters in a compressed format. During training, when an operation needs the value of a compressed parameter, OMC decompresses it on-the-fly and deallocates memory for the decompressed value immediately after it is consumed. Therefore, OMC keeps the compressed parameters and a smaller number of transient decompressed parameters in memory, which uses less memory than the full-precision parameters.

A design challenge of some implementations OMC is achieving a favorable accuracy-efficiency trade-off since, with OMC, compression and decompression can optionally occur in every training iteration. As a result, the error introduced by compression can accumulate quickly and degrade model accuracy significantly. On the other hand, using a complicated algorithm to control the accumulated error can significantly slow down training and/or utilize a significant quantity of computational resources. In view of these and other considerations, various implementations of OMC seek to operate as simple and fast as possible while mitigating impact on model accuracy. Some of those various implementations of OMC achieve this goal by using quantization, per variable transformation, weight matrices only quantization, and/or partial parameter quantization—each of which is described in more detail herein.

Implementations of OMC reduce memory usage in forward and/or back propagation using a model. There are three main sources of memory usage in forward and/or back propagation using a model: model parameters, activations, and gradients. OMC aims to reduce the memory usage of model parameters. Implementations of OMC, that transmit a compressed model from a server and a client (and/or vice versa), additionally or alternatively reduce network traffic. Because models are transported between servers and clients, reducing the model size helps reduce communication cost. Implementations of OMC additionally or alternatively enable lightweight operation, which is particularly beneficial (or even necessary) on resource constrained client devices. In those implementations, OMC does not significantly slow down the training process even though compression and decompression occur frequently.

FIG. 1 illustrates a view 100 of the framework of an implementation Online Model Compression (OMC). OMC stores parameters in a compressed parameter data 102 in a compressed format, such as floating-point numbers with reduced bitwidths, but performs computations in full precision or other hardware-supported formats. This design decouples compression formats and hardware-supported formats to provide higher flexibility for choosing the compression format and method to achieve better memory usage reduction.

When performing forward propagation 112 (represented by the dashed line path in FIG. 1), OMC decompresses parameters on an as-needed basis to generate decompressed layer parameters 104 for that layer (e.g., layer N, where N is any integer) for layer-N processing 110, on the fly, and deallocates the decompressed copies immediately after they are consumed. When performing back propagation 108 for a layer (represented by the non-dashed line path in FIG. 1), OMC provides decompressed layer parameters 114 and applies the gradients to update them. The updated decompressed parameters 106 are then compressed and discarded immediately. Therefore, OMC keeps the compressed parameter data 102 and a number of transient decompressed copies in memory. The transient decompressed copies, that are in memory at a given time during forward and/or back propagation, can include some (or all) parameter(s) of a layer, or first parameter(s) from a given layer and second parameter(s) from an adjacent layer.

Quantization reduces the number of bits (i.e., bitwidth) for representing a value. While full precision (e.g., 32 bits) quantization can be used in deep learning, neural networks have been shown to be error-resilient and allow using much lower bitwidths, such as 1 to 8 bits, without harming prediction accuracy. However, such low bitwidths are usually utilized for inference (i.e., forward propagation only). Reducing memory usage by quantization during training (e.g., which includes back propagation) is more difficult because training requires more bits to precisely accumulate smaller gradients across training iterations.

In some implementations, OMC adopts the floating-point format as a non-limiting example, although other formats, such as the fixed-point format, can also be used. The floating-point format can comprise three parts: the sign bits, the exponent bits, and the mantissa bits. For example, the format of FP32 (32-bit single-precision floating-point format) is composed of 1-bit sign, 8-bit exponent, and 23-bit mantissa. To quantize a floating-point value, the quantity numbers of bits can be reduced for the exponent and the mantissa, which are the two hyper-parameters of floating-point quantization.

Quantization can be a lossy operation and thus, can undesirably introduce quantization errors. As a result, quantizing parameters for every training iteration can lead to a larger accumulated error and prevent usage of fewer bits with the original accuracy maintained. To mitigate quantization error, implementations of OMC perform per variable transformation. Per variable transformation can include, on a per variable basis, decompressing the variables 202 to generate initial decompressed parameters 204, and applying a linear transformation on the initial decompressed parameters 204 to generate transformed parameters 206, which is illustrated in view 200 of FIG. 2. This step is performed per variable, such as per weight matrices, so that all the model parameters in a variable can share a few transformation-related parameters to make the memory overhead negligible for the resulting layer-variable data 208. This can also be performed, in reverse, during compression (e.g., of updated variables). Generally, per variable transformation can utilize a per-variable scaling factor and/or bias, generated and stored along with the compressed data during compression, to refine an initially decompressed parameter (using the scaling factor and/or bias) to mitigate the extent of loss from the compression and decompression.

In some instances, some types of parameters are more sensitive to quantization than the others. These sensitive parameters can include the scaling factors and/or biasing values in normalization layers. In contrast, weight matrices in convolutional and feed-forward layers are less sensitive to quantization but dominate the model size. For example, the weight matrices in a streaming Conformer model can account for 99.8% of the model size. Hence, in some implementations, OMC quantization can be limited to weight matrices, while keeping the remaining variables in FP32. This method helps maintain accuracy while saving a large amount of memory.

OMC also leverages the feature of federated learning that there are many clients training a model in parallel to further reduce quantization errors. This feature provides an opportunity to quantize only a subset of parameters for each client and vary the selection from one client to another. As a result, the server or other remote system can receive high-quality and precise updates of each parameter from the clients that do not quantize this parameter.

Figure 3:
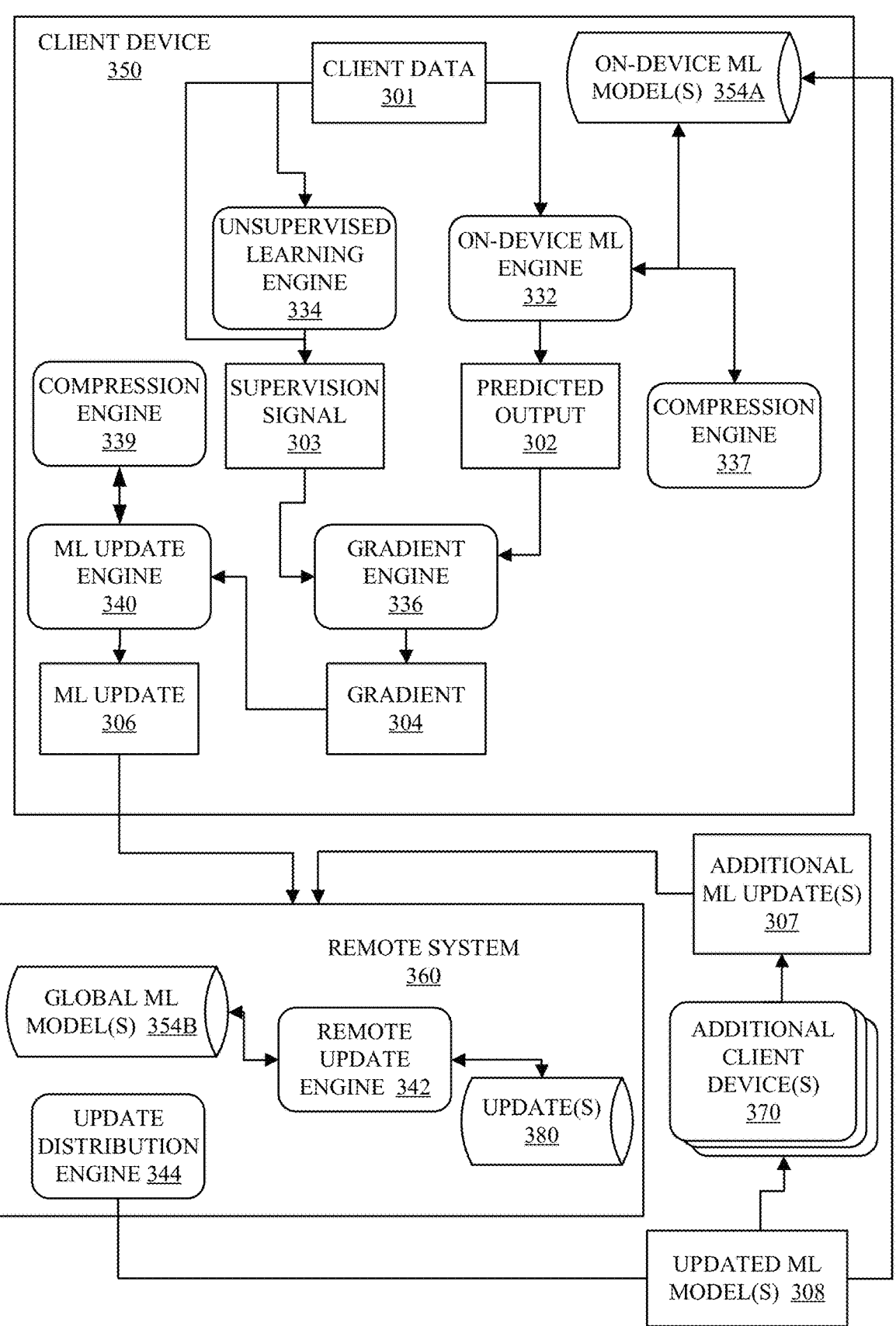
FIG. 3 illustrates example process flows that demonstrate various aspects of the present disclosure.

FIG. 3 illustrates example process flows that demonstrate various aspects of the present disclosure. A client device 350 is illustrated in FIG. 3, and includes at least the components that are encompassed within the box of FIG. 3 that represents the client device 350. The client device 350 can receive client data 301 via various components and/or sensors. For example, the client data 301 received at the client device 350 can include spoken utterances captured in audio data generated via one or more microphones of the client device 350, typed input captured in textual data generated via a touch-sensitive display of the client device 350 or peripheral device in communication with the client device 350 (e.g., a keyboard integral with the client device 350 or an external keyboard), touch input based captured in touch data generated via the touch-sensitive display of the client device 350 one or more buttons of the client device 350 (e.g., one or more hardware buttons and/or software buttons), gesture input captured in vision data generated via one or more vision components of the client device 350, and/or any other type of client data 301 that can be received by the client device 350 via other components and/or sensors.

Further, the client device 350 can include one or more on-device machine learning (ML) models stored in on-device memory of the client device 350, such as an on-device ML model(s) database 354A. In some implementations, and based on processing the client data 301, the on-device ML models can be utilized to cause certain fulfillment of the client data 301 to be performed. In additional or alternative implementations, and based on processing the client data 301, the on-device ML models can be updated locally at the client device 350 and/or the on-device ML models can be utilized in generating one or more updates at the client device 350 for counterpart global ML models that are stored remotely in remote memory of a remote system 360 (e.g., a remote server or cluster of remote servers or other computing devices), such as in global ML model(s) database 354B. The remote system includes at least the components that are encompassed within the box of FIG. 3 that represents the remote system 360. The client device 350 and the remote system 360 are communicatively coupled over one or more networks (e.g., over one or more local area networks (LANs) and/or wide area networks (WANs)) for transmitting and receiving data therebetween.

As described herein, implementations are directed to improved efficiency of federated learning of ML model(s). Similar to traditional federated learning, on-device ML engine 332 can process, using one or more on-device ML models stored in the on-device ML model(s) database 354A, the client data 301 to generate predicted output 302. The one or more on-device ML models utilized by the on-device ML engine 332 may depend on a type of the client data 301 received at the client device 350. For example, assume the client data 301 corresponds to audio data generated via one or more microphones of the client device 350. In this example, the on-device ML engine 332 can utilize one or more audio-based ML models to process the client data 301 in generating the predicted output 302, such as an automatic speech recognition (ASR) model, a hotword detection model, a continued conversation model, a voice identification model, a voice activity detection (VAD) model, an endpointing model, and/or other audio-based ML models. Further, the predicted output 302 (and/or predicted values associated therewith, such as probabilities, log likelihoods, binary values, and/or any other predicted values) in this example can be based on the one or more audio-based ML models utilized in processing the client data 301.

Also, for example, additionally or alternatively assume the client data 301 corresponds to vision data generated via one or more vision components of the client device 350. In this example, the on-device ML engine 332 may utilize one or more vision-based ML models to process the client data 301 in generating the predicted output 302, such as an object detection model, an object classification model, a face identification model, and/or other vision-based ML models. Further, the predicted output 302 (and/or predicted values associated therewith, such as probabilities, log likelihoods, binary values, and/or any other predicted values) in this example can be based on the one or more vision-based ML models utilized in processing the client data 301. Also, for example, additionally or alternatively assume the client data 301 corresponds to textual data or touch data generated via one or more user interface input components of the client device 350 (or generated based on processing audio data and/or vision data). In this example, the on-device ML engine 332 can utilize one or more text-based ML models and/or touch-based ML models to process the client data 301 in generating the predicted output 302, such as natural language understanding (NLU) model, a fulfillment model, and/or other text-based ML models and/or touch-based ML models. Further, the predicted output 302 (and/or predicted values associated therewith, such as probabilities, log likelihoods, binary values, and/or any other predicted values) in this example can be based on the one or more text-based ML models and/or touch-based ML models utilized in processing the client data 301.

In furtherance of facilitating efficient processing of client data 301 by the on-device ML engine 332, compression engine 337 can be utilized to decompress on-device ML model parameters on the fly. The parameter(s) that are decompressed by the compression engine at a given time are a subset of the compressed on-device ML model parameter(s) and can be the next parameter(s) that are needed in performing a propagation. For example, the parameter(s) that are decompressed can include only some parameter(s) of a given ML model layer, all parameter(s) of a given ML model layer, or at least some parameter(s) of a given ML model layer and at least some parameter(s) of an additional given ML model layer. As a particular example, for processing an input to an Nth layer of the on-device ML model, compressed parameters from the on-device ML model database 354A can be decompressed by the compression engine 337. The compression engine 337 can allocate memory for the decompressed parameters for a particular layer of a given on-device ML model, process the decompressed parameters with an input to the Nth layer in furtherance of forward propagation, and deallocate the memory for the decompressed parameters. This process can be repeated for each layer of multiple layers of the on-device ML model, thereby preserving memory of the client device 350 when processing client data 301 and/or performing forward propagation to generate a predicted output 302.

In various implementations, to cause the on-device ML models to be updated locally at the client device 350 and/or the on-device ML models to be utilized in generating the one or more updates at the client device 350 for the counterpart global ML models, the client device 350 can cause the predicted output 302 to be provided to a gradient engine 336. The gradient engine 336 can compare the predicted output 302 with a supervision signal 303 to generate a gradient 304. In some implementations, the supervision signal 303 can be an implicit supervision signal generated using an unsupervised learning engine 334. The unsupervised learning engine 334 can utilize one or more self-supervised learning techniques and/or semi-supervised learning techniques to generate the supervision signal 303 in instances where a supervision signal is not available based on explicit user feedback (e.g., feedback from a human user of the client device 350 and/or feedback from a human annotator of the client data 301), which is typical in federated learning of ML model(s) due to privacy considerations. For example, assume the client data 301 corresponds to audio data generated via one or more microphones of the client device 350, and further assume that the on-device ML engine 332 processes the audio data, using an on-device ASR model, to generate and select a given speech hypotheses that is predicted to correspond to a spoken utterance captured in the audio data. In this example, the unsupervised learning engine 334 can utilize the one or more self-supervised learning techniques and/or semi-supervised learning techniques described herein to generate the supervision signal 303 even if a human user of the client device 350 does not provide any express feedback with respect accuracy of the given speech hypotheses.

In additional or alternative implementations, the supervision signal 303 can be an express supervision signal generated based on the client data 301 and the unsupervised learning engine 334 can optionally be omitted (e.g., feedback from a human user of the client device 350). For example, again assume the client data 301 corresponds to audio data generated via one or more microphones of the client device 350, and again assume that the on-device ML engine 332 processes, using an on-device ASR model, the audio data to generate and select a given speech hypotheses that is predicted to correspond to a spoken utterance captured in the audio data. However, further assume that a human user of the client device 350 corrects one or more terms or phrases of the given speech hypotheses. In this example, the correction may be captured in the client data 301 and utilized as the supervision signal 303 without using the unsupervised learning engine 334. However, in this example, the unsupervised learning engine 334 can additionally or alternatively utilize the one or more self-supervised learning techniques and/or semi-supervised learning techniques described herein to generate an additional or alternative supervision signal.

In some implementations, the gradient 304 (and other gradients) can be derived from a loss function used to train the ML model(s) (e.g., the on-device ML model(s) and/or the global ML model(s)), such that the gradient represents a value of that loss function (or a derivative thereof) obtained from a comparison of the supervision signal 303 to the predicted output 302. For example, when the supervision signal 303 and the predicted output 302 match, the gradient engine 336 can generate a zero gradient. Also, for example, when the supervision signal 303 and the predicted output 302 do not match, the gradient engine 336 can generate a non-zero gradient that is optionally dependent on the extent of the mismatching. The extent of the mismatching can be based on an extent of mismatching between deterministic comparisons of the supervision signal 303 to the predicted output 302. In additional or alternative implementations, the gradient 304 (and other gradients) may be derived from a loss function used to train the ML model(s), such that the gradient 304 represents a value of that loss function (or a derivative thereof) determined based on the predicted output 302 (e.g., without considering any supervision signals).

Traditionally, in federated learning, a plurality of client devices (e.g., the client device 350 and one or more of the additional client devices 370) each generate a corresponding gradient for a corresponding on-device ML model based on corresponding client data received a given one of the plurality of client devices. For example, each of the plurality of client devices can have a corresponding counterpart on-device ML model stored in corresponding on-device memory, and process the corresponding client data to generate gradients for the corresponding instances of the corresponding on-device ML models. In some implementations, the gradient engine 336 can cause the gradient 304 to be stored in on-device memory of the client device 350 along with other gradients generated at the client device 350 until one or more client device conditions are satisfied (e.g., described with respect to FIG. 3) to cause the gradient 304 (and other gradients) to be transmitted to the remote system 360. In additional or alternative implementations, the gradient engine 336 can cause the gradient 304 to be provided to ML update engine 340. The ML update engine 340 can generate a ML update 306 based on the gradient 304 that optionally includes an indication of the type of global ML model to be updated based on the ML update 306 (e.g., an ASR update when the ML update 306 if generated based on a gradient for an ASR model, a hotword update when the ML update 306 if generated based on a gradient for a hotword model, and so on). In additional or alternative implementations, the ML update engine 340 can cause the corresponding counterpart on-device ML model to be updated based on the gradient 304.

The ML update engine 340 can cause the gradient 304 to be backpropagated across the one or more on-device ML layers to update one or more corresponding on-device weights, and/or one or more other parameters, of the one or more on-device ML layers. In some implementations, the gradient 304 can be utilized during back propagation as a basis for updating parameters of the on-device ML model, and this back propagation can involve using decompressed parameters that have been decompressed by a compression engine 339 on the fly. For example, when determining updated parameters for an Nth layer of the on-device ML model, the compression engine 339 can decompress a subset of compressed ML model parameters, while leaving other ML model parameters compressed and stored at the client device 350. Memory can be allocated for the decompressed parameters during processing to determine the updated parameters for the Nth layer and then deallocated for the decompressed, in furtherance of allowing other parameters for an Mth layer to be decompressed by the compression engine 339 and buffered into allocated memory. Any updated parameters can be selectively compressed, or left as decompressed, by the compression engine 339 and collectively stored as an ML update 306 that can be shared with the remote system 360 and/or utilized to further refine an ML update that is shared with the remote system 360 when certain optional criteria is met.

In traditional federated learning, the corresponding counterpart global ML model can be updated in a distributed manner in that the corresponding counterpart global ML model is updated based on gradients (e.g., the gradient 304 and/or one or more additional gradients) or updates (e.g., the ML update 306 and/or one or more of the additional ML updates 307) generated at a plurality of client devices. However, a considerable amount of computational and network resources may be consumed at each of the plurality of client devices in generating these gradients or updates. Accordingly, by utilizing techniques described herein, both computational and network resources that would otherwise be consumed at each of the plurality of client devices may be conserved by enabling each of the client devices to generate and transmit less data compared to traditional federated learning.

The remote update engine 342 can utilize at least the ML update 306 received from the client device 350 and/or one or more of the additional ML updates 307 to update one or more of the global ML models stored in the global ML model(s) database 354B. In some implementations, the ML update 306 received from the client device 350 and/or one or more of the additional ML updates 307 can be received in a compressed format and stored in an update(s) database 380 when they are received at the remote system 360. Alternatively, or additionally, the ML update 306 received from the client device 350 and/or one or more of the additional ML updates 307 can be received in a format in which less than all of the parameters are compressed, thereby allowing other parameters that are sensitive to quantization to remain non-compressed. In some versions of those implementations, the remote update engine 342 can obtain the updates to update one or more of the global ML models when one or more remote system conditions are satisfied. In additional or alternative implementations, the remote update engine 342 may update one or more of the global ML models as the ML update 306 is received from the client device 350 and/or as one or more of the additional ML updates 307 is received from one or more of the additional client devices 370.

Notably, the remote update engine 342 can update the corresponding global ML models in various manners based on a type of the ML update 306 is received from the client device 350 and/or as one or more of the additional ML updates 307 is received from one or more of the additional client devices 370. For example, the remote update engine

342 can identify a particular global ML model, from among the global ML models stored in the global ML model(s) database 354B, to update global layers and/or global parameters thereof. In some implementations, the remote update engine 342 can identify the particular global ML model based on the indication of the type of global ML model to be updated based on the ML update 306 and/or one or more of the additional ML updates 307. For example, if a plurality of updates for an ASR model are received and/or stored in the update(s) database 380, the remote update engine 342 can identify the corresponding counterpart global ASR model to be updated. Further, how the remote update engine 342 updates the corresponding counterpart global ASR model can be based on content of the ML update 306 and/or one or more of the additional ML updates 307.

In some implementations, the remote update engine 342 can assign the updates to specific iterations of updating of one or more of the global ML models based on one or more criteria. The one or more criteria can include, for example, the types of updates available to the remote update engine 342, a threshold quantity of updates available to the remote update engine 342 (and optionally for the disparate portions of the one or more global ML models), a threshold duration of time of required to perform the updates, and/or other criteria. In particular, the remote update engine 342 can identify multiple sets or subsets of updates generated by the client devices 350 and/or 370. Further, the remote update engine 342 can update one or more of the global ML models based on these sets or subsets of the updates. In some further versions of those implementations, a quantity of updates in the sets or subsets may be the same or vary. In yet further versions of those implementations, each of the sets or subsets of updates can optionally include updates from at least two unique client devices. In other implementations, the remote update engine 342 can utilize the updates to update one or more of the global ML models in a first in, first out (FIFO) manner without assigning any update to a specific iteration of updating of one or more of the global ML models.

Update distribution engine 344 can transmit one or more of the updated global ML models 308 (e.g., including the updated global ML model itself, updated layers thereof, and/or updated weights and/or other parameters thereof) to the client device 350 and/or one or more of the additional client devices 370. In some implementations, the update distribution engine 344 can transmit one or more of the updated global ML models 308 in response to one or more remote system conditions being satisfied at the remote system 360 and/or one or more client device conditions being satisfied at the client device 350 and/or one or more of the additional client device 370. Notably, one or more of the updated global ML models 308 can be transmitted to the client device 350 and/or one or more of the additional client device 370 in a synchronous manner or asynchronous manner. Upon receiving one or more of the updated global ML models 308, one or more of the updated global ML models 308 can replace the corresponding on-device ML model counterpart stored in the on-device memory thereof with one or more of the updated global ML models 308. Further, the client devices 350 and/or 370 can subsequently use one or more of the updated on-device ML model(s) to make predictions based on further client data received at the client device 350 and/or one or more of the additional client device 370. The client device 350 and/or one or more of the additional client device 370 can continue transmitting the updates to the remote system 360 in the manner described herein. Further, the remote system 360 can continue updating one or more of the global ML models in the manner described herein.

Figure 4:
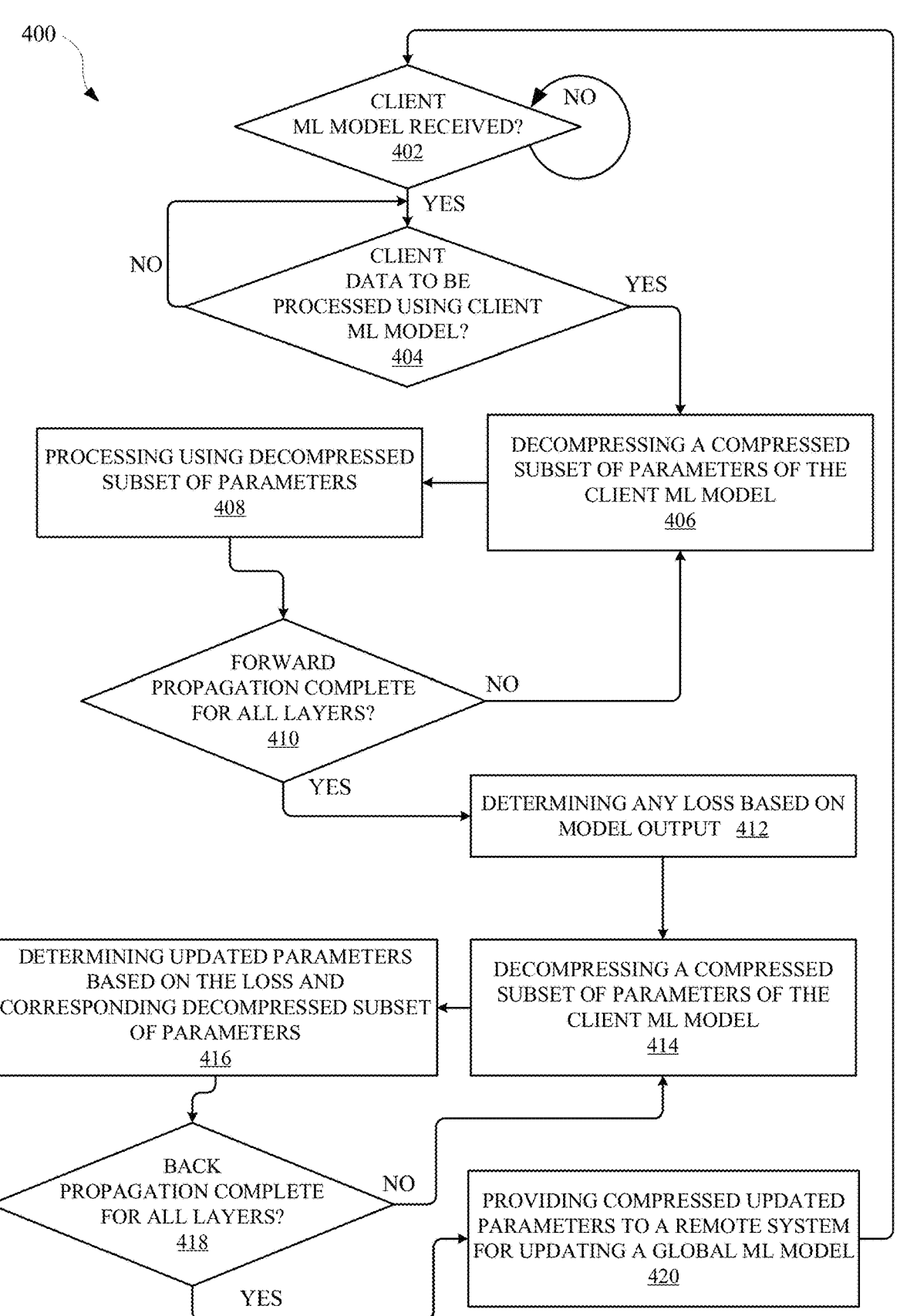
FIG. 4 illustrates a method for performing on the fly compression and/or decompression of a client ML model to facilitate efficient forward and/or back propagation for federated learning.

FIG. 4 illustrates a method 400 for performing, on the fly, decompression and compression of model parameters at edge devices during federated learning, and sharing updated compressed parameters with a remote system for updating a corresponding global ML model. The method 400 can be performed by one or more client computing devices, applications, and/or any other apparatus or module that can assist with federated learning.

The method 400 can include an operation 402 of determining whether a client ML model has been received at a client device. For example, determining whether the client ML model has been received at a client device from a remote server system that is managing a federated learning process. The client ML model can include client ML model data that characterizes various model parameters (e.g., weight matrices, biasing value matrices, etc.). The client ML model includes some compressed parameters. For example, a majority of the ML model parameters can be compressed, 90% or more of the ML model parameters can be compressed, and/or all of the ML model parameters can be compressed. When a client ML model has been received, the method 400 can proceed from the operation 402 to an operation 404, otherwise the method 400 can await receipt of a client ML model.

The operation 404 can include determining whether client data is to be processed using the client ML model. The client data can include, but is not limited to, image data, audio data, video data, and/or any other data that can be captured or otherwise processed by a client device. For example, the client ML model can be an ASR model, and the client data can include audio data that captures a spoken utterance from a user. When the client data is determined to be processed using the client ML model, the method 400 can proceed from the operation 404 to an operation 406. Otherwise, the client data can be processed otherwise and/or the method 400 can return to the operation 404.

The operation 406 can include decompressing a compressed subset of parameters of the client ML model. For example, some or all of the compressed parameters for an initial layer of the client ML model can be decompressed in an initial iteration of operation 406 (without decompressing any other compressed parameters in the initial iteration), the remaining compressed parameters for the initial layer and/or parameter(s) for a next layer can be decompressed in a second iteration of operation 406 (without decompressing any of the compressed parameters in the second iteration), etc. Put another way, at each iteration of operation 406 the compressed subset of parameters, that are decompressed in that iteration, can be a next subset needed in performing the forward propagation.

In some implementations, the compressed subset of parameters can include values from a weight matrix and/or array, and/or values from a biasing value matrix and/or array. When the subset of parameters is decompressed, other subsets of parameters of the client ML model data can remain compressed (but optionally still in memory, in a compressed format), such as other parameters that may be used to facilitate forward propagation at other layers of the client ML model. Memory can be allocated for the decompressed parameters, and, upon completion of any calculations for the current decompressed parameter(s), the memory can be de-allocated for those decompressed parameters and re-allocated for another subset of to be decompressed parameters.

The method 400 can then proceed from the operation 406 to an operation 408, which can include performing processing using the decompressed subset of parameters. For example, decompressed weight values for a particular layer and non-compressed biasing values for the particular layer can be processed in furtherance of facilitating forward propagation. When processing is completed using the decompressed subset of parameters, the method 400 can proceed from the operation 408 to an operation 410, which can include determining whether forward propagation is complete for all layers of the client ML model. When forward propagation is completed, the method 400 can proceed from the operation 410 to an operation 412. Otherwise, when forward propagation is not complete, the method 400 can proceed from the operation 410 to the operation 406, and another compressed subset of parameters can be decompressed for further facilitating forward propagation.

The operation 412 can include determining any loss based on a model output. For example, a loss can be determined based on comparing the model output to ground truth data (e.g., based on feedback from the user, indication of what was said by the user, etc.). The loss can then be utilized to facilitate back propagation and determine updated parameters for the client ML model, which can then be shared with the remote system or otherwise provide a basis for other data that is shared with the remote system.

For example, the method 400 can proceed from the operation 412 to an operation 414, which can include decompressing a compressed subset of parameters of the client ML model. The subset of parameters can be decompressed for facilitating back propagation, and allocated to memory until back propagation is completed for those parameter(s). For example, some or all of the compressed parameters for a terminal layer of the client ML model can be decompressed in an initial iteration of operation 412 (without decompressing any other compressed parameters in the initial iteration), the remaining compressed parameters for the terminal layer and/or parameter(s) for a preceding layer can be decompressed in a second iteration of operation 412 (without decompressing any of the compressed parameters in the second iteration), etc. Put another way, at each iteration of operation 412 the compressed subset of parameters, that are decompressed in that iteration, can be a next subset needed in performing the back propagation. When the subset of parameters have been decompressed, the method 400 can proceed from the operation 414 to an operation 416.

The operation 416 can include determining updated parameters based on the loss and corresponding decompressed subset of parameters. The updated parameters can include, but are not limited to, updated parameter(s) of the subset, one or more updated weight values, one or more updated biasing values, and/or any other updated value or function that can be utilized by an ML model. The updated parameters can then be compressed and/or stored in memory until back propagation is completed. For example, the method 400 can proceed from the operation 416 to an operation 418, which can include determining whether back propagation has been completed for all layers and/or for the client ML model.

When back propagation is completed, the method 400 can proceed from the operation 418 to an operation 420, otherwise the method 400 can proceed from the operation 418 to the operation 414 for furthering back propagation. The operation 420 can include providing compressed and/or non-compressed updated parameters to a remote system for updating a global ML model.

Note that some parameters for some layers can be compressed, while some parameters for other layers may remain non-compressed when shared with the remote system. In this way, layers and/or parameters (e.g., biasing values) that may be susceptible to errors during quantization can remain non-compressed, while other layers and/or other parameters that are less susceptible to errors during quantization can be compressed for preserving computational resources such as memory and network bandwidth.

In some implementations, operations 412, 414, 416, 418, and 420 can be omitted. In those implementations, compression and decompression techniques can be utilized herein for forward propagation/at inference, without any utilization for back propagation.

Figure 5:
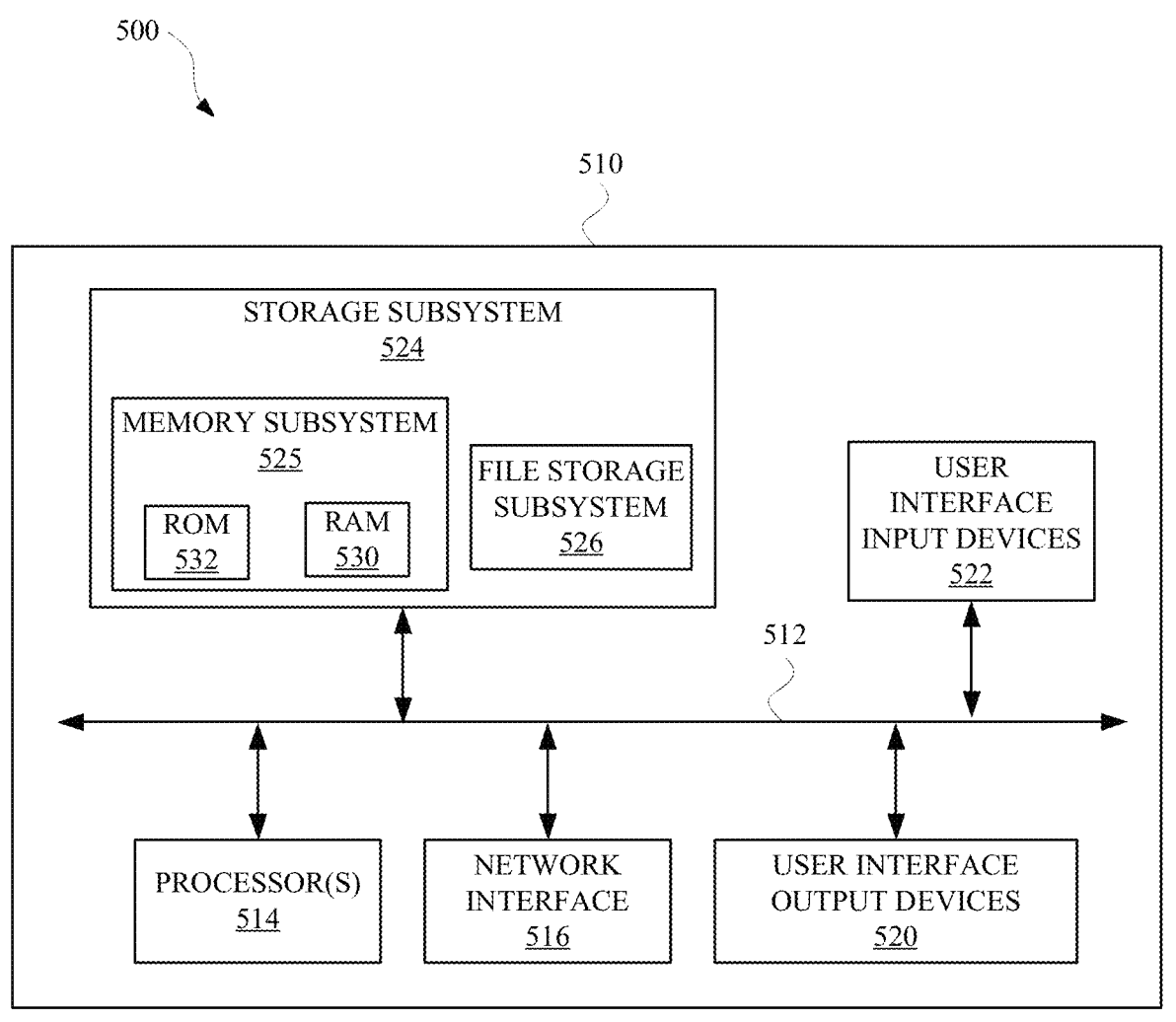
FIG. 5 is a block diagram of an example computer system

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of FIG. 3, client device 350, remote system 360, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by processor(s) of a client device is provided and includes receiving, from a remote system, a client machine learning (ML) model in a compressed format. The remote system hosts a global ML model that corresponds to the client ML model and the client ML model includes compressed model parameters for processing model input data. The method further includes, for each of multiple compressed subsets of the compressed model parameters of the client ML model, to facilitate forward propagation, and while all other of the compressed subsets of parameters of the client ML model remain compressed: decompressing the compressed subset of parameters to generate a corresponding decompressed subset of parameters; and processing corresponding data using the corresponding decompressed subset of parameters to generate a next iteration of the corresponding data and in furtherance of determining a predicted output from the forward propagation. The method further includes determining, based on the predicted output from the forward propagation, a loss in furtherance of updating the compressed model parameters. The method further includes, for each of multiple compressed subsets of the compressed model parameters of the client ML model, to facilitate back propagation, and while all other of the compressed subsets of parameters of the client ML model remain compressed: decompressing the compressed subset of parameters to generate the corresponding decompressed subset of parameters; processing a remaining portion of the loss and the corresponding decompressed subset of parameters to generate corresponding decompressed updated parameters for the corresponding decompressed subset of parameters; compressing the corresponding decompressed updated parameters to generate corresponding updated compressed parameters for the client ML model; and storing the corresponding updated compressed parameters. The method further includes providing, to the remote system from the client device, the corresponding compressed updated parameters for the client ML model. The global ML model is updated by at least decompressing, by the remote system, the corresponding compressed updated parameters from the client device.

In some implementations, decompressing the compressed subset of parameters, for a given one of the compressed subsets, to facilitate forward propagation, includes deallocating client device memory for an additional one of the decompressed subsets utilized in an immediately preceding iteration of the forward propagation.

In some implementations, decompressing the compressed subset of parameters, for the given one of the compressed subsets, to facilitate back propagation, includes deallocating client device memory for a further one of the decompressed subsets utilized in an immediately preceding iteration of the back propagation.

In some implementations, the client ML model includes non-compressed model parameters that are also utilized to facilitate forward propagation and/or back propagation.

In some implementations, the client ML model is utilized by the client device to facilitate automatic speech recognition (ASR) and an initial instance of the corresponding data is based on audio captured by the client device or another computing device.

In some implementations, decompressing the compressed subset of parameters includes applying a corresponding scaling factor and/or a corresponding biasing value to each parameter of the decompressed subset of parameters.

In some implementations, determining the loss is based on comparing the predicted output to a ground truth value.

In some implementations, a method implemented by processor(s) of a client device is provided and includes receiving, from a remote system, a client machine learning (ML) model in a compressed format. The remote system hosts a global ML model that corresponds to the client ML model and the client ML model includes compressed model parameters for processing model input data. The method further includes, for each of multiple compressed subsets of the compressed model parameters of the client ML model, to facilitate forward propagation, and while all other of the compressed subsets of parameters of the client ML model remain compressed: decompressing the compressed subset of parameters to generate a corresponding decompressed subset of parameters; and processing corresponding data using the corresponding decompressed subset of parameters to generate a next iteration of the corresponding data and in furtherance of determining a predicted output from the forward propagation. The method further includes determining, based on the predicted output from the forward propagation, a loss in furtherance of updating the compressed model parameters. The method further includes providing, to the remote system, compressed updated parameters that are for the client ML model and that are generated based on the loss. Providing the compressed updated parameters to the remote system causes the remote system to update the global ML model based on a decompression of the compressed updated parameters.

In some implementations, a method implemented by processor(s) of a client device is provided and includes receiving, from a remote system, a client machine learning (ML) model in a compressed format. The method further includes, for each of multiple compressed subsets of the compressed model parameters of the client ML model, to facilitate forward propagation, and while all other of the compressed subsets of parameters of the client ML model remain compressed: decompressing the compressed subset of parameters to generate a corresponding decompressed subset of parameters; and processing corresponding data using the corresponding decompressed subset of parameters to generate a next iteration of the corresponding data and in furtherance of determining a predicted output from the forward propagation. The method further includes performing one or more actions based on the predicted output from the forward propagation.

In some implementations, decompressing the compressed subset of parameters, for a given one of the compressed subsets, to facilitate forward propagation, includes deallocating client device memory for an additional one of the decompressed subsets utilized in an immediately preceding iteration of the forward propagation.

In some implementations, the client ML model, received from the remote system, includes non-compressed model parameters that are also utilized to facilitate forward propagation. In some of those implementations, the non-compressed model parameters include a plurality of bias parameters, and the compressed model parameters include a plurality of weight parameters.

In some implementations, the client ML model is utilized by the client device to facilitate automatic speech recognition (ASR) and an initial instance of the corresponding data is based on audio captured by the client device or another computing device. In some of those implementations, the one or more actions include: rendering a transcription, of the audio data, determined based on the predicted output and/or controlling one or more applications based on the transcription determined based on the predicted output.

In some implementations, decompressing the compressed subset of parameters includes applying a corresponding scaling factor and/or a corresponding biasing value to each parameter of the decompressed subset of parameters.

We claim:

1. A method implemented by one or more processors of a client device, the method comprising:

receiving, from a remote system, a client machine learning (ML) model in a compressed format, wherein the remote system hosts a global ML model that corresponds to the client ML model, and the client ML model includes compressed model parameters for processing model input data;

for each of multiple compressed subsets of the compressed model parameters of the client ML model, to facilitate forward propagation, and while all other of the compressed subsets of parameters of the client ML model remain compressed:

decompressing the compressed subset of parameters to generate a corresponding decompressed subset of parameters; and processing corresponding data using the corresponding decompressed subset of parameters to generate a next iteration of the corresponding data and in furtherance of determining a predicted output from the forward propagation;

determining, based on the predicted output from the forward propagation, a loss in furtherance of updating the compressed model parameters;

for each of multiple compressed subsets of the compressed model parameters of the client ML model, to facilitate back propagation, and while all other of the compressed subsets of parameters of the client ML model remain compressed:

decompressing the compressed subset of parameters to generate the corresponding decompressed subset of parameters;

processing a remaining portion of the loss and the corresponding decompressed subset of parameters to generate corresponding decompressed updated parameters for the corresponding decompressed subset of parameters;

compressing the corresponding decompressed updated parameters to generate corresponding updated compressed parameters for the client ML model; and storing the corresponding updated compressed parameters; and providing, to the remote system from the client device, the corresponding compressed updated parameters for the client ML model, wherein the global ML model is updated by at least decompressing, by the remote system, the corresponding compressed updated parameters from the client device.

2. The method of claim 1, wherein decompressing the compressed subset of parameters, for a given one of the compressed subsets, to facilitate forward propagation, includes deallocating client device memory for an additional one of the decompressed subsets utilized in an immediately preceding iteration of the forward propagation.

3. The method of claim 2, wherein decompressing the compressed subset of parameters, for the given one of the compressed subsets, to facilitate back propagation, includes deallocating client device memory for a further one of the decompressed subsets utilized in an immediately preceding iteration of the back propagation.

4. The method of claim 1, wherein the client ML model includes non-compressed model parameters that are also utilized to facilitate forward propagation and/or back propagation.

5. The method of claim 1, wherein the client ML model is utilized by the client device to facilitate automatic speech recognition (ASR) and an initial instance of the corresponding data is based on audio captured by the client device or another computing device.

6. The method of claim 1, wherein decompressing the compressed subset of parameters comprises:

applying a corresponding scaling factor and/or a corresponding biasing value to each parameter of the decompressed subset of parameters.

7. The method of claim 1 wherein determining the loss is based on comparing the predicted output to a ground truth value.

8. A method implemented by one or more processors of a client device, the method comprising:

receiving, from a remote system, a client machine learning (ML) model in a compressed format, wherein the remote system hosts a global ML model that corresponds to the client ML model, and the client ML model includes compressed model parameters for processing model input data;

for each of multiple compressed subsets of the compressed model parameters of the client ML model, to facilitate forward propagation, and while all other of the compressed subsets of parameters of the client ML model remain compressed:

decompressing the compressed subset of parameters to generate a corresponding decompressed subset of parameters; and processing corresponding data using the corresponding decompressed subset of parameters to generate a next iteration of the corresponding data and in furtherance of determining a predicted output from the forward propagation;

determining, based on the predicted output from the forward propagation, a loss in furtherance of updating the compressed model parameters; and providing, to the remote system, compressed updated parameters that are for the client ML model and that are generated based on the loss, wherein providing the compressed updated parameters to the remote system causes the remote system to update the global ML model based on a decompression of the compressed updated parameters.

9. The method of claim 8, wherein decompressing the compressed subset of parameters, for a given one of the compressed subsets, to facilitate forward propagation, includes deallocating client device memory for an additional one of the decompressed subsets utilized in an immediately preceding iteration of the forward propagation.

10. The method of claim 8, wherein the client ML model, received from the remote system, includes non-compressed model parameters that are also utilized to facilitate forward propagation.

11. The method of claim 10, wherein the non-compressed model parameters include a plurality of bias parameters, and the compressed model parameters include a plurality of weight parameters.

12. The method of claim 8, wherein the client ML model is utilized by the client device to facilitate automatic speech recognition (ASR) and an initial instance of the corresponding data is based on audio captured by the client device or another computing device.

13. The method of claim 8, wherein decompressing the compressed subset of parameters comprises:

applying a corresponding scaling factor and/or a corresponding biasing value to each parameter of the decompressed subset of parameters.

14. A method implemented by one or more processors of a client device, the method comprising:

receiving, from a remote system, a client machine learning (ML) model in a compressed format;

for each of multiple compressed subsets of compressed model parameters of the client ML model, to facilitate forward propagation, and while all other of the compressed subsets of parameters of the client ML model remain compressed:

decompressing the compressed subset of parameters to generate a corresponding decompressed subset of parameters; and processing corresponding data using the corresponding decompressed subset of parameters to generate a next iteration of the corresponding data and in furtherance of determining a predicted output from the forward propagation;

performing one or more actions based on the predicted output from the forward propagation.

15. The method of claim 14, wherein decompressing the compressed subset of parameters, for a given one of the compressed subsets, to facilitate forward propagation, includes deallocating client device memory for an additional one of the decompressed subsets utilized in an immediately preceding iteration of the forward propagation.

16. The method of claim 14, wherein the client ML model, received from the remote system, includes non-compressed model parameters that are also utilized to facilitate forward propagation.

17. The method of claim 16, wherein the non-compressed model parameters include a plurality of bias parameters, and the compressed model parameters include a plurality of weight parameters.

18. The method of claim 14, wherein the client ML model is utilized by the client device to facilitate automatic speech recognition (ASR) and an initial instance of the corresponding data is based on audio captured by the client device or another computing device.

19. The method of claim 18, wherein the one or more actions include:

rendering a transcription, of the audio data, determined based on the predicted output, and/or controlling one or more applications based on the transcription determined based on the predicted output.

20. The method of claim 14, wherein decompressing the compressed subset of parameters comprises:

applying a corresponding scaling factor and/or a corresponding biasing value to each parameter of the decompressed subset of parameters.

* * * * *